Jan. 24, 1939.     G. SCHMITT     2,144,940
ANIMAL TRAP
Filed Oct. 18, 1937     2 Sheets-Sheet 1

Inventor
George Schmitt
By Clarence A. O'Brien
Attorney

Jan. 24, 1939.　　　　　G. SCHMITT　　　　　2,144,940
ANIMAL TRAP
Filed Oct. 18, 1937　　　　2 Sheets-Sheet 2
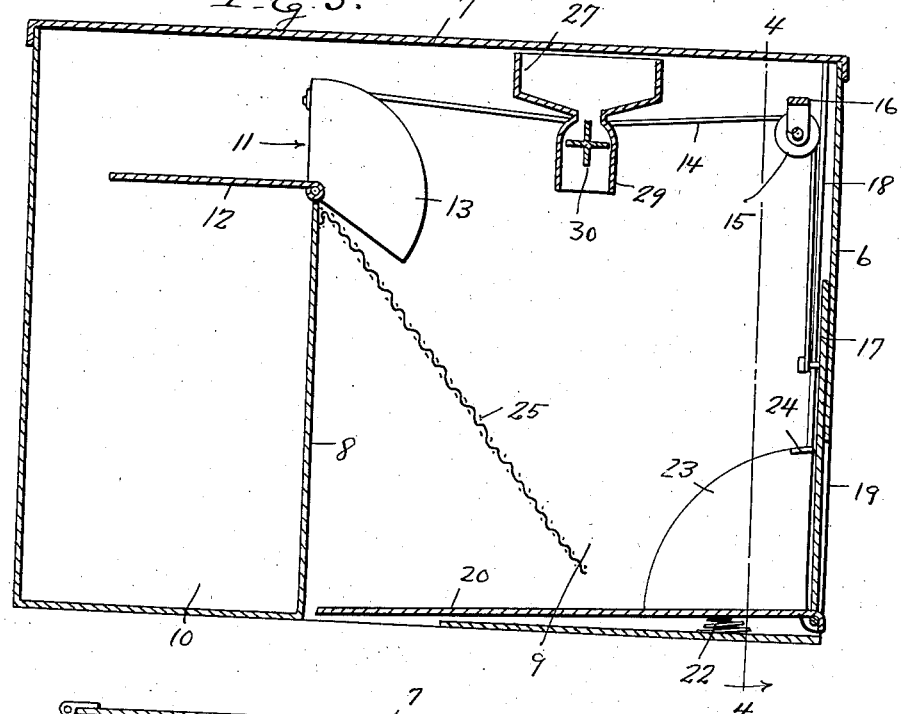
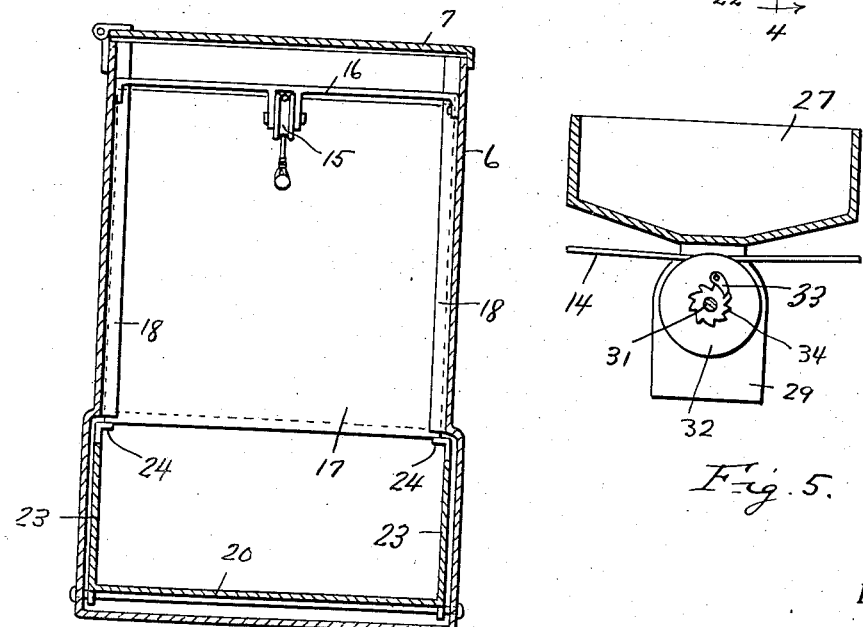
Inventor
George Schmitt
By Clarence A. O'Brien
Attorney Patented Jan. 24, 1939

2,144,940

UNITED STATES PATENT OFFICE 2,144,940

ANIMAL TRAP

George Schmitt, Nogales, Ariz.

Application October 18, 1937, Serial No. 169,706

4 Claims. (Cl. 43—76)

This invention relates to an improved animal trap which is especially designed for catching and exterminating rodents such as mice, rats, and the like.

In carrying the invention into practice, I have developed a structural organization of parts cooperating in producing a complete device which is characterized by a number of different advantageous details such as enable the trap to better fulfill the requirements of a structure of this class.

The trap is designed with an animal actuated platform for tripping the door and includes a water filled tank and means for automatically dumping the animal into the tank for extermination, wherein said means has operating connection with the door as well as with an intermittently operable bait delivery hopper.

Other features and advantages will become more readily apparent from the following description and drawings.

In the drawings:

Figure 3 is a view like Figure 1 showing the door closed and the associated treadle plate elevated.

Figure 4 is a transverse vertical section on the line 4—4 of Figure 3.

Figure 5 is a cross-section on the line 5—5 of Figure 2.

Figure 1:
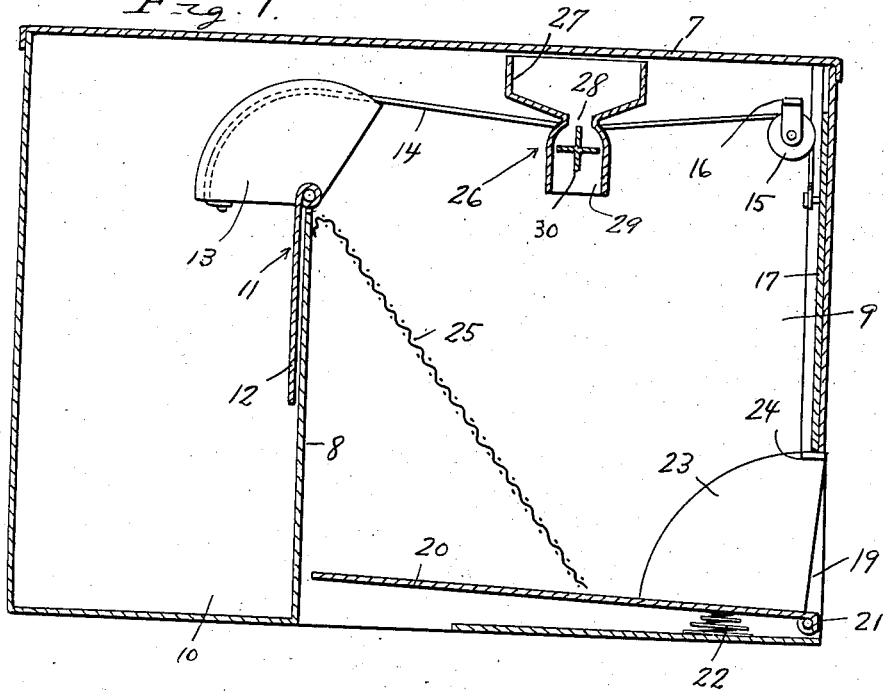
Figure 1 is a vertical sectional view through a trap constructed in accordance with the present invention showing the door elevated to open position and the tank treadle plate dropped.

Referring now to the drawings by reference numerals, it will be seen that the main casing is of general box-like formation and distinguished by the numeral 6. It is provided with a hingedly mounted cover plate 7 permitting access to be had to the interior.

Near one end of the casing I provide a vertical partition 8 and this is located with respect to the bottom, top, end and side walls to cooperate therewith in defining a so-called trapping chamber or compartment 9 on one side, and a water containing and animal exterminating tank 10 on the other side. The upper end of the partition 8 terminates on a plane below the top 7 and hingedly connected thereto is a dumping unit. This is unitarily referred to by the numeral 11 and comprises a treadle plate 12 and a companion segmental actuating member 13. This part 13 is obviously integrally or rigidly connected with the treadle plate 12 so that it may be swung in conjunction therewith from the position shown in Figure 3 to the dumping position shown in Figure 1. The peripheral or edge portion of the segmental member 13 is provided with a groove to accommodate the adjacent end portion of the door actuating cable 14. In fact, the cable is attached at one end to this member as indicated in the drawings. The cable is also trained at its opposite end over a pulley 15, the latter being supported on the hanger or combination bar 16.

The front end of the cord is connected with a sliding trap door 17 the latter operating in guide channels 18. The door is adapted to slide down to close the entrance opening 19 as seen in Figure 1.

The numeral 20 designates an internal platform which is hingedly mounted as at 21 and which rests on the spring cushion 22. This platform is provided with upstanding walls 23 having retaining lugs 24 engageable beneath the lower end of the door to hold it in an elevated position. These lugs constitute trip means for the door. The door is gravity lowered.

The numeral 25 designates a wire runway or chute leading from the lower portion of the compartment 9 to the top of the partition so as to allow the animal to climb up and onto the treadle plate 12 when it is in the horizontal position represented in Figure 3.

The numeral 26 designates a bait hopper which includes a trough 27 for containing the bait (not shown). This trough has a discharge hole 28 aligned with a short feed tube 29. Located in this tube is a bladed rotor or feeder 30 mounted on a shaft 31 as shown in Figure 5. Also mounted on this shaft is a sheave 32 in the form of an idler. This carries an operating pawl 33 cooperable with the ratchet 34 which is keyed on the shaft.

The intermediate portion of the cable is wrapped around this sheave in such a manner as to enable it to operate the feeder and to allow the bait (not shown) to be dropped from the hopper into the bottom of the compartment 9 and on the platform 20 to entice the animals to enter.

Figure 2:
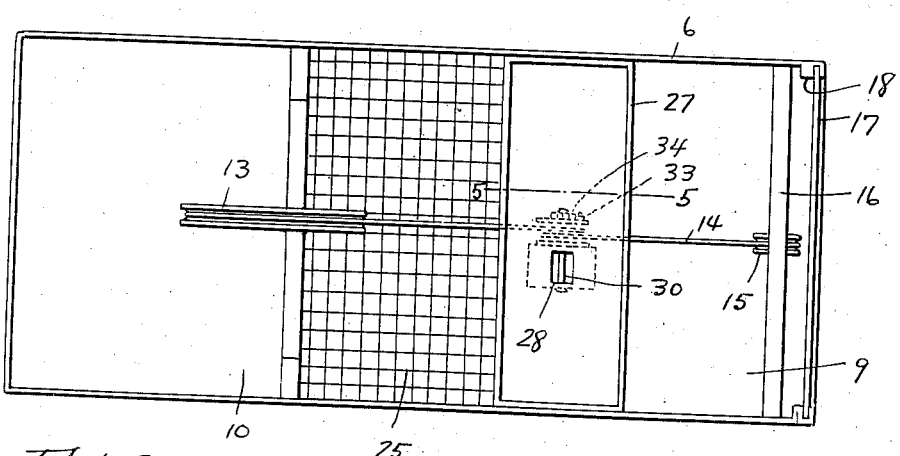
Figure 2 is a top plan view of the structure shown in Figure 1 with the cover removed.

Referring now to Figure 2, it will be seen that the trap is set. In this position the trap door 17 is elevated and resting on the trip lugs 24. At the same time, the elevation of the door allows the cable 14 to become sufficiently slack to permit the treadle plate 12 to drop down into the tank 10.

This is accomplished through the operating connection 13 between the treadle and the cable as well as the operating connection of the cable with a fastener on the door 17. It has already been pointed out that the intermediate portion of the cable is trained around the sheave 32 on the feeder shaft 31.

Obviously, as the animal enters the entrance opening 19 and stands upon the platform 20, the platform is depressed against the tension of the spring 22 and in so doing the lugs 24 are swung clear of the lower end of the door 17. The weight of the door causes it to gravitate to a position to close the opening 19 and to entrap the animal in the box 6, or rather, the compartment 9.

The animal in seeking to escape, naturally runs up the chute 25. It will be observed that as the door 17 went down, the cable 14 served to automatically elevate the treadle plate 12 to the horizontal position represented in Figure 3.

The animal, being unaware of the function of the treadle plate 12, will stand thereon and in doing this will overbalance the mechanism in such a way as to permit the animal to be cast down into the water in the tank 10 and drowned.

This downward tripping of the treadle plate serves to elevate the door 17 automatically through the medium of the pull cord or cable 14. Also, as the door swings up, this spring 22 lifts the platform to engage the lugs 24 therebeneath and to hold the door in an elevated state in making the next catch.

The operation of the cable also serves to actuate the feeder 30 and to replenish the supply of bait from the feed hopper 27. The hopper being located above the platform, it is obvious that the bait will drop down onto the platform for enticing the next animal into the trap.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. An animal trap comprising a casing divided by a partition into a trapping compartment and a water containing tank, one wall of said compartment being formed with an entrance opening with guides, and a gravity lowered door slidable in said guides and positioned to close said entrance opening, an animal actuated platform pivotally mounted in the lower portion of said compartment and provided with trip means engageable with said door for holding said door in an elevated position, a pivoted treadle carried by said partition and extending into said water tank, an operating connection between the treadle and said door, and a chute leading from said compartment to the tank, a bait hopper mounted in the upper portion of said compartment and including a rotary feeder, said operating connection being operatively connected with said feeder.

2. In a trap of the class described, a casing provided with an internal partition dividing it into a water containing tank and a trapping compartment, the front wall of said compartment being provided with an entrance opening, guides carried by said entrance opening, a sliding door mounted in said guides for closing the opening, a spring elevated animal depressed platform pivotally mounted in said compartment, means carried by the pivoted end for engaging beneath the door and holding the door in an elevated position, a treadle plate pivotally mounted on the upper end of said partition and extending into said tank, a segmental element carried by said plate, a hanger in said compartment, a pulley carried by said hanger, a cable attached at one end to the door and trained over said pulley, and fastened at its opposite end to said segmental element, together with a chute leading from said compartment to said tank to allow the animal to approach the treadle plate, said treadle plate and cable constituting the means for re-setting the trap door.

3. In a trap of the class described, a casing provided with an internal partition dividing it into a water containing tank and a trapping compartment, the front wall of said compartment being provided with an entrance opening, guides carried by said entrance opening, a sliding door mounted in said guides for closing the opening, a spring elevated animal depressed platform pivotally mounted in said compartment, means carried by the pivoted end for engaging beneath the door and holding the door in an elevated position, a treadle plate pivotally mounted on the upper end of said partition and extending into said tank, a segmental element carried by said plate, a hanger in said compartment, a pulley carried by said hanger, a cable attached at one end to the door and trained over said pulley, and fastened at its opposite end to said segmental element, together with a chute leading from said compartment to said tank to allow the animal to approach the treadle plate, said treadle plate and cable constituting the means for resetting the trap door, a bit hopper including a drop tube, a rotary feeder in said tube, and an operating sheave associated with said feeder, the intermediate portion of said cable being trained over said sheave so as to operate the feeder as the door is elevated and reset for the next operation.

4. An animal trap of the class described comprising a casing divided by a vertical partition into a trapping compartment and a water containing animal dumping and exterminating tank, the entrance end wall of said compartment being formed with an entrance opening, a gravity lowered door slidable to open and close said entrance opening, an animal actuated platform operatively mounted in the lower portion of said compartment and provided with trip means engageable with said door, to hold the door when the trap is set, in an elevated position, a dump plate pivotally mounted on said partition and adapted to overlie and swing down into said water tank, said plate being provided with a fixedly connected actuating member, a pulley supported in the upper portion of said trapping compartment, and a flexible operating cable, said cable being attached at one end to said door, the intermediate portion being trained over said pulley, the opposite end of said cable being operatively connected with said actuating member.

GEORGE SCHMITT.